United States Patent
Jamal et al.

[19]

[11] Patent Number: 5,901,186
[45] Date of Patent: May 4, 1999

[54] BAD FRAME DETECTION

[75] Inventors: Karim Jamal, Stockholm; Fredrik Jansson, Sundbyberg, both of Sweden

[73] Assignee: Telefonaktieboalget LM Ericsson, Stockholm, Sweden

[21] Appl. No.: 08/737,765
[22] PCT Filed: Apr. 19, 1995
[86] PCT No.: PCT/SE95/00423
  § 371 Date: Oct. 28, 1996
  § 102(e) Date: Oct. 28, 1996
[87] PCT Pub. No.: WO95/30282
  PCT Pub. Date: Nov. 9, 1995

[30] Foreign Application Priority Data

Apr. 28, 1994 [SE] Sweden .................................. 9401462
Oct. 6, 1994 [SE] Sweden .................................. 9403386

[51] Int. Cl.$^6$ ................................ H03D 1/04; H03K 5/01; H03K 6/04; H04B 1/10
[52] U.S. Cl. ........................ 375/346; 375/365; 371/37.5; 371/37.7
[58] Field of Search ...................... 375/354, 365, 375/316, 346; 371/37.4, 37.5, 37.7, 39.1, 38.1, 53, 54; 370/506

[56] References Cited

U.S. PATENT DOCUMENTS 4,967,413  10/1990  Otani ....................................... 371/37.4
5,113,400   5/1992  Gould et al. ................................. 371/43

Primary Examiner—Chi H. Pham
Assistant Examiner—Bryan Webster
Attorney, Agent, or Firm—Burns, Doane, Swecker & Mathis, L.L.P.

[57] ABSTRACT

In a digital radio communication system in which information is transmitted and received in time slots and some bits of each received audio frame is interleaved over at least two time slots and other bits in each audio frame at are non-interleaved, bad received audio frames are detected by detecting possible bit errors in a channel encoded non-interleaved bit sequence in each received time slot. If bit errors have been detected in this bit sequence a bad received frame is indicated.

20 Claims, 3 Drawing Sheets

BAD FRAME DETECTION

BACKGROUND

The present invention relates to an apparatus and a method for bad frame detection in a digital communication system.

Methods for coding/decoding of speech signals in a radio communication system are well known and even standardized (for example IS-54 in the U.S. and GSM in Europe). Furthermore, methods for improving encoding/decoding of background sounds, primarily intended for digital cellular telephone systems, have been described in Swedish Patent Application 93 00290-5. Both these types of methods are primarily designed to handle a situation where the connection between the speech encoder and the speech decoder is close to ideal, in the sense that only a small amount of bit or transmission errors remain after channel decoding. However, since the connection is a radio channel the received signal may contain some bit or transmission errors. In such cases it may be necessary to modify the methods mentioned above.

Thus, it is essential to be able to reliably detect bad received frames in order to perform these modified methods. Usually a cyclic redundancy check (CRC) is used at the receiver as a quality measure. If the CRC fails this is an indication that the received frame may be bad. Another quality measure is so called soft information from the detector. This soft information essentially indicates the probability of the received speech frame (or parts of it) to be correct. A problem with the first type of measure (CRC) is that a speech frame is interleaved over a number of time slots. Since the CRC requires the bits from all these time slots before the check can be made, this implies a delay until the decision can be made and error concealment measures can be taken. A problem with soft information is that it is difficult to set thresholds correctly. If the thresholds are set too low a high false alarm rate will occur (acceptable frames treated as bad frames).

An object of the present invention is an apparatus and a method in which bad frames are more reliably detected to enable bad frame concealment in accordance with the above mentioned modified methods.

SUMMARY

In accordance with the invention this object is solved by a method and apparatus for detecting bad received frames in a receiver in a digital communication system in which information is transmitted and received in signal bursts. Some bits of each frame have a first interleaving depth, and other bits in each frame have a second interleaving depth, the second interleaving depth being lower than the first interleaving depth. Possible bit errors are detected in a predetermined redundancy-containing bit sequence having the second interleaving depth. A bad received frame is indicated if at least one bit error has been detected in the bit sequence.

BRIEF DESCRIPTION OF THE DRAWINGS

The invention, together with further objects and advantages thereof, may best be understood by making reference to the following description taken together with the accompanying drawing, in which.

DETAILED DESCRIPTION

Figure 1:
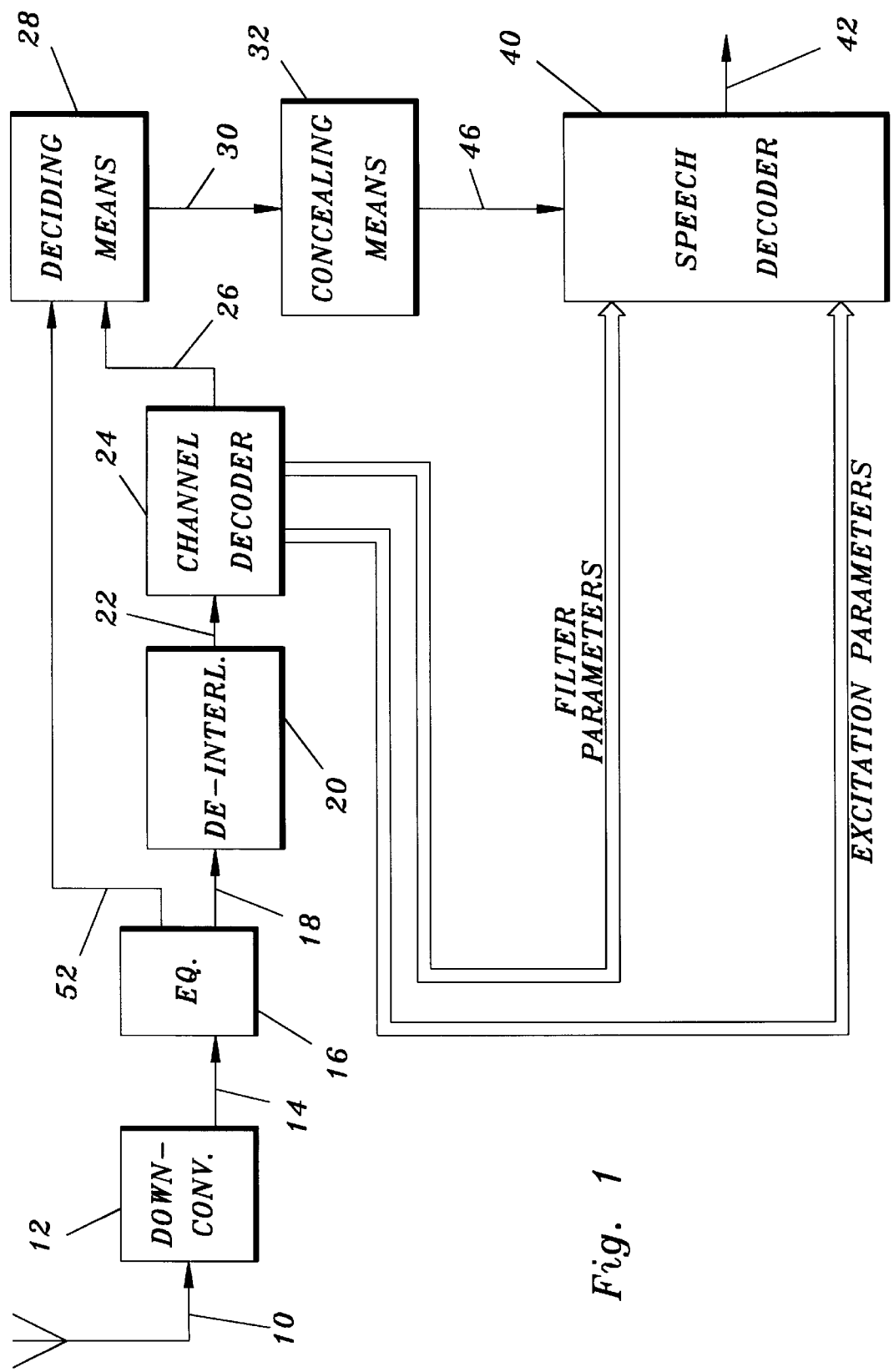
FIG. 1 is a schematic block diagram of the relevant parts of a receiver in a radio communication system containing an apparatus in accordance with the present invention.

To understand the operation of the invention it is useful to briefly review the operation of a typical digital cellular radio connection and typical bad frame concealment techniques.

In a communication link of a digital cellular telephone system the audio signal is first digitized and then a speech coding algorithm is applied (see for example "Applications of voice processing to telecommunications", Lawrence R. Rabiner, Proc. IEEE, Vol. 82, No 2, pp 199–228). This algorithm compresses the speech signal and transforms it to a number of quantized parameters (usually in a frame based manner). The resulting bits are thereafter protected by addition of coding redundancy, using channel encoding techniques (see for example G. C. Clark and J. B. Cain, "Error Correction Coding for Digital Communication", Plenum Press, 1981). Furthermore, some of the bits of a frame to be transmitted are interleaved over several time slots. A time slot will therefore contain bits from several frames. The resulting bit stream is then modulated (see for example J. G. Proakis, "Digital Communication", 2nd edition, McGraw-Hill, 1989) and transmitted, for example using TDMA (Time Division Multiple Access) techniques. At the receiver the signal is demodulated. Possible time or multipath dispersion can be countered by various equalization techniques, for example Viterbi equalization or decision feedback equalization (see for example the reference by J. G. Proakis above). After de-interleaving channel decoding (see for example the reference by G. C. Clark and J. B. Cain above) is used in order to decode the received bits. The bits that form the quantized parameters of a frame that the speech decoder needs in order to reconstruct the transmitted speech signal are thus obtained by de-interleaving information from several time slots. It is clear from the above discussion that disturbances on the transmission channel may affect the reconstructed speech signal, thus reducing the quality of that signal.

Although channel encoding/decoding techniques can reduce the sensitivity to disturbances significantly, it is usually not enough to apply only channel coding in a digital cellular system. On the contrary, it is quite common to additionally use so called error concealment techniques in order to further mask the perceptual effects of bit errors remaining at the input of the speech decoder. These techniques mostly rely on some information on the quality of the transmission channel, such information being available or estimated at the receiving end. When such information indicates that the quality of the transmission channel is poor, the error concealment techniques initiate special actions in the speech decoder, with the purpose of reducing the negative effects of bit errors on the reconstructed speech signal. The level of sophistication of the error concealment techniques is dependent on the character of the information on the quality of the transmission channel. A few ways to obtain such information will now be described.

Direct information on the channel quality can be obtained by measuring the signal strength. A low value would then indicate a low signal to noise ratio, which means that the channel quality can be expected to be poor. Channel coding techniques provide a further level of sophistication. One type of technique is to use redundant channel coding, e.g. Cyclic Redundancy Check (CRC) (see for example the reference by G. C. Clark and J. B. Cain above), in particular when the code is used for error detection. Moreover, "soft" (not binary quantized) information may be obtained from the convolutional decoder (in case a convolutional code is used), demodulator, equalizer, and/or block code decoder (see for example the reference by J. G. Proakis above). One technique that is often applied is to divide the information bits from the speech encoder into different classes, each with different error correction/detection schemes, thereby reflecting different importance of different bits (see for example EIA/TIA IS-54B). Hence, parts of the information with error detection/correction codes applied may be used as indicators of possible bit errors present in the speech frame.

Some techniques to introduce error concealment in conventional speech decoders with the intention of masking frames that are considered to contain bit errors will now be briefly described. When a bad frame is detected, it is common to use the information from the previous accepted frame. Often this technique is combined with attenuation of the output level in case the bad frame situation should persist for several frames (see for example EIA/TIA IS-54B). This situation is not unusual in mobile telephone systems, where fading dips can persist for quite long periods of time in cases where the mobile velocity is low. The result of attenuation is that disturbances are masked in the reconstructed signal. In particular loud "clicks" are avoided. When more detailed information is available on the quality of each received part of incoming bits, it becomes possible to trace down possible transmission errors to certain parameters of the speech decoder. Since said parameters model different phenomena of speech, error concealment techniques can be developed that are optimized to the physical meaning of each particular parameter. One particular example is the so called pitch gain (see for example T. B. Minde et al., "Techniques for low bit rate speech coding using long analysis frames", ICASSP, Minneapolis, USA, 1993). A pitch gain value larger than one is sometimes needed for this parameter during transient periods of speech. Such a value does, however, correspond to an unstable filter model, which means that it may be somewhat dangerous to use it. In particular, it is suitable to introduce error concealment techniques that limit the pitch gain to values less than one whenever a possible bit error in that parameter is detected. A further example is the spectral filter model that is commonly used in modern speech coding algorithms (see for example the reference by T. B. Minde et al. above). In that case error concealment techniques can be used in order to prevent the use of unstable filters when bit errors are indicated in the corresponding spectral information. The reverse is also of relevance; whenever an unstable filter is detected, a bad frame may be indicated and error concealment techniques may be applied.

In for example the American digital cellular system in accordance with the standard IS-54B a stolen frame for FACCH would result in a lost speech frame at the speech decoder in the receiver. The speech decoder solves this problem by "filling in" suitable information. Usually the corresponding information from the previous frame is used instead of the lost frame.

If the decoder provides so called anti-swirling actions for background sounds the quality of the resulting audio signal may be unacceptable if the above concealment methods for speech were used. As described in Swedish patent application 93 00290-5 the anti-swirling actions can be performed in several ways. One possible action is a bandwidth expansion of the filter. This means that the poles of the filter are moved towards the origin of the complex plane. Another possible modification is low-pass filtering of the filter parameters in the temporal domain. That is, rapid variations from frame to frame of the filter parameters, or representations thereof, are attenuated by low-pass filtering at least some of said parameters. A special case of this method is averaging of a representation of the filter parameters over several frames.

With this background information in mind, the present invention will now be described with reference to FIG. 1. FIG. 1 shows the parts of a receiver in a mobile radio communication system necessary to describe a preferred embodiment of the present invention. An antenna receives the information from the transmitted signal and forwards it over an input line 10 to a down-converter 12. Down-converter 12 converts the received signal to base band and forwards it over a line 14 to a data detection circuit, which in the shown embodiment is represented by an equalizer 16, for example a Viterbi-equalizer, which converts the received and down-converted signal into a bit stream, which is forwarded over a line 18 to a de-interleaver 20. If the received frame contains bits from a traffic channel the bit stream is over a line 22 forwarded to a channel decoder 24. Channel decoder 24 converts the bit stream into a filter parameter stream and an excitation parameter stream for speech decoding.

Equalizer 16 also forwards "soft" information on received bits or symbols to a deciding means 28 over line 52. As mentioned above channel decoder 24 converts the bit stream into a filter parameter stream and an excitation parameter stream for speech decoding in a speech decoder 40 which outputs an audio signal on an output line 42. Furthermore, channel decoder 24 performs cyclic redundancy check (CRC) decoding on at least parts of each received frame. The results of these checks are forwarded to deciding means 28 over a line 26. A concealing means 32 connected to deciding means 28 controls the processing of filter and excitation parameters in speech decoder 40 over a line 46. Concealing means 32 may be implemented by a microprocessor as a state machine.

In a preferred embodiment the receiver also contains a speech detector (not shown). A suitable speech detector is described in WO 89/08910 by British Telecom PLC. This speech detector determines from said filter and excitation parameters whether the received frame contains primarily speech or background sounds. The decision of the speech detector is forwarded to a parameter modifier for modifying the received filter parameters (optionally a signal discriminator to determine whether received signals representing background sounds are stationary or not may be included between the speech detector and the parameter modifier). This modification is described in detail in Swedish Patent Application 93 00290-5, which is hereby incorporated by reference. The possibly modified filter parameters and the excitation parameters are forwarded to speech decoder 40.

The cyclic redundancy check from channel decoder 24 is formed on a frame by frame and not a time slot by time slot basis. However, it would be desirable to have an indication of a bad frame on a time slot by time slot basis. Thus, it would be desirable to perform error detection, for example a cyclic redundancy check, on a time slot by time slot basis. Such detection would give an early warning of an upcoming bad frame. In for example the US standard IS-54B there is a signal in each time slot that identifies each channel, namely the Coded Digital Verification Color Code (CDVCC). This is a 12-bit coded non-interleaved version of the 8-bit digital verification color code and is sent in each slot in both the forward and reverse links. The code used is a simple (15, 11) code shortened to a (12, 8) Hamming code, and is thus a single-error correcting code. In the receiver, for example in channel decoder 24, it is thus possible to construct a flag DvccError that is true if at least one error has occurred in the decoded DVCC. Therefore DvccError may be used as an indication of a bad frame. This indication is sent to deciding means 28 on line 26. There it may be combined with the other information received by deciding means 28. This process will be further described with reference to FIG. 3.

Figure 2:
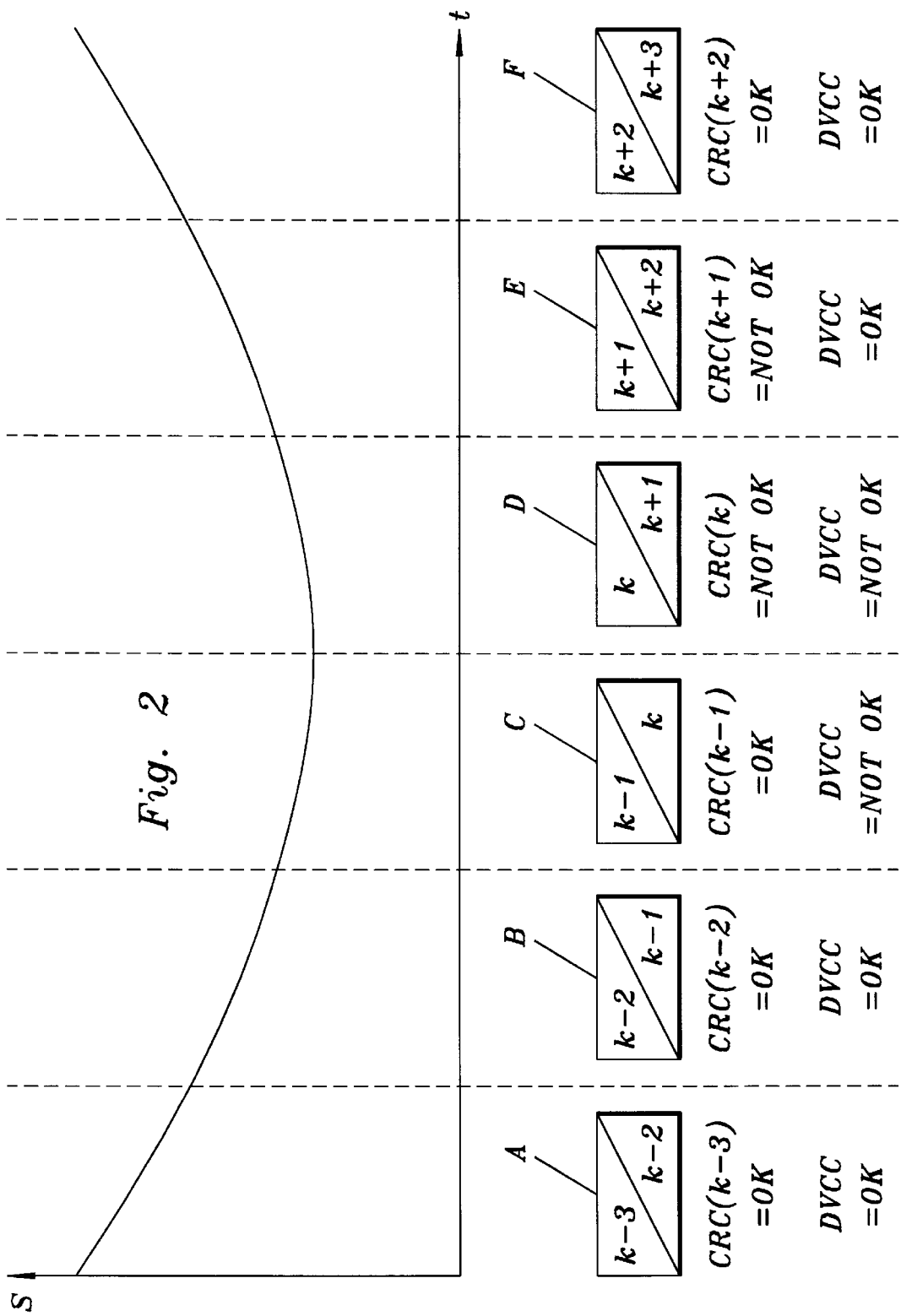
FIG. 2 is a time diagram of a received signal strength and corresponding time slots.

FIG. 2 illustrates the signal strength S of a received signal as a function of time t. FIG. 2 also illustrates corresponding time slots A, . . . , F. Each time slot contains interleaved information from two speech frames (as in IS-54B). For example, time slot B contains information from frame k-2 and k-1, while time slot C contains the remaining information from frame k-1 and information from frame k. The gaps between the illustrated time slots represent the other channels (the corresponding time slots have been omitted) that occupy the same frequency.

When a frame has been assembled after de-interleaving a CRC is performed. For example, CRC(k-2) is performed when frame k-2 has been assembled after de-interleaving of time slots A and B. In the figure time slots C and D contain bad information since the signal strength is too low during these slots. Thus, CRC(k) will fail (CRC (K)=NOT OK). However, frame k-1 is considered to be acceptable since CRC(k-1) did not fail (CRC(k-1)=OK) although time slot C was received with a very low signal strength and may contain errors. The result is that frame k-1 is accepted as the latest correctly received frame although it may contain errors.

According to the present invention error detection is also performed on the DVCC field in every time slot. This error detection (DVCC=NOT OK) on the DVCC field will detect a bad time slot in slot C and give an indication that frame k-1 may contain errors, since parts of this frame arrived in time slot C. Therefore frame k-1 may be declared unacceptable and frame k-2 may be considered as the latest acceptable frame. This will give a more reliable input to an error concealment algorithm.

Figure 3:
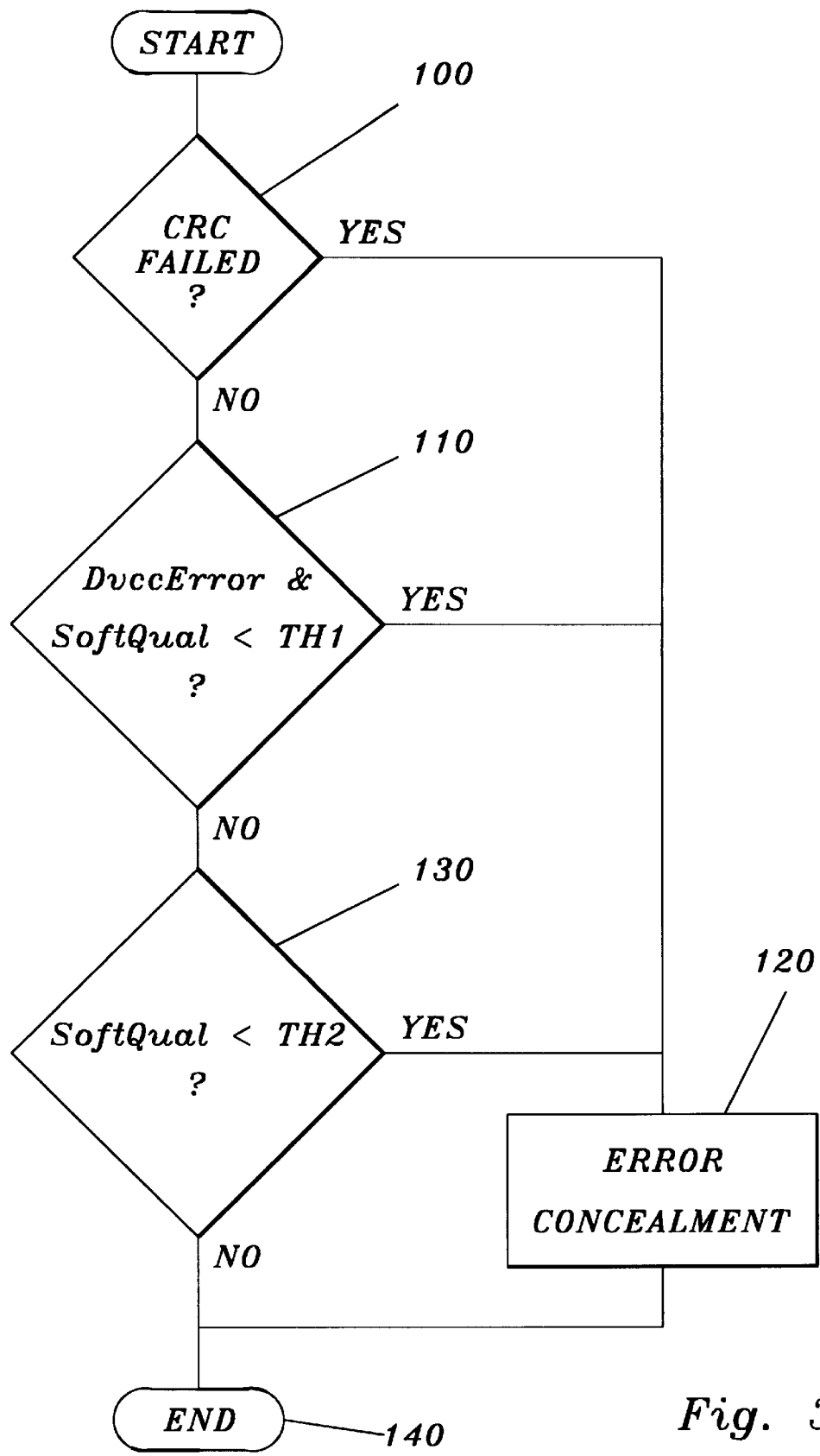
FIG. 3 is a flow chart of the method in accordance with the present invention.

A preferred embodiment of the method in accordance with the present invention will now be described with reference to the flow chart in FIG. 3. Only the steps that are essential for understanding the present invention are shown. In step 100 the routine tests whether the regular CRC for a frame has failed. If this is the case the routine proceeds to a routine for error concealment in step 120. Otherwise the DvccError flag is tested in step 110. If the flag is true it is also tested whether SoftQual is less than a threshold TH1. If both these conditions are true the routine proceeds to the routine for error concealment in step 120. Otherwise step 130 tests whether SoftQual is less than a second threshold TH2. If this is the case error concealment is performed in step 120. Otherwise the routine ends in step 140. Without the present invention there would have been no step 110. Due to step 110 the threshold TH1 can be set more aggressive (higher) since the test is combined with the DvccError flag test. Thus, if a time slot has both a rather low soft information quality and a true DvccError flag error concealment is necessary. If the DvccError flag is not true the SoftQual parameter can still trigger the error concealment algorithm in step 120, but in this case it must be lower than a second threshold TH2, which is more conservative (lower) than the first threshold TH1. Thus, in this case the soft information must more strongly indicate a bad time slot in order to trigger the error concealment algorithm in step 120.

The invention has been described with reference to the digital verification color code. However, from the above description it is clear that other channel encoded parameters that appear in each time slot could be used instead of or in combination with the digital verification color code. It is an essential feature of the invention that a chosen parameter should contain redundancy (for example be channel encoded) to allow easy error detection.

Furthermore, the invention has been described with reference to a digital radio communication system of TDMA type. However the same principles may be applied to any systems in which information is sent in signal bursts. For example, it is not necessary that several channels share the same frequency or that the bursts are transmitted at regular time intervals. The invention may also be used in for example wire bound communication systems.

It is also possible to generalize the above described ideas by noting that it is actually not necessary to require that the tested redundancy containing parameter must be non-interleaved. Similar improvements are obtained if the parameter has an interleaving depth that is less than the interleaving depth for a speech frame (here interleaving depth is defined as the number of bursts over which information is interleaved). An earlier indication of a bad frame is still obtained since the parameter is de-interleaved sooner than the complete speech frame.

It will be understood by those skilled in the art that various modifications and changes may be made to the present invention without departure from the spirit and scope thereof, which is defined by the appended claims.

We claim:

1. A method of detecting bad received frames in a receiver in a digital communication system in which information is transmitted and received in signal bursts, some bits of each frame having a first interleaving level and other bits in each frame having a second interleaving level, said second interleaving level being lower than said first interleaving level, the method comprising the steps of:

detecting possible bit errors in a predetermined redundancy-containing bit sequence having said second interleaving level; and indicating a bad received frame if at least one bit error has been detected in said bit sequence.

2. The method of claim 1, wherein said bit sequence has an interleaving level of 1, and said bit sequence is included in each signal burst.

3. The method of claim 2, wherein by said predetermined bit sequence is channel encoded.

4. The method of claim 3, wherein by said digital communication system is a digital radio communication system.

5. The method of claim 4, wherein by said digital radio communication system is a TDMA system.

6. The method of claim 2, wherein by said indication of a bad received frame is combined with other indications of a bad received frame.

7. The method of claim 6, wherein by said indication of a bad received frame is logically combined with other indications of a bad received frame.

8. The method of claim 7, wherein said other indications are based on soft information on received bits.

9. The method of claim 2, wherein said predetermined bit sequence is also used for another purpose than error detection.

10. The method of claim 9, wherein said bit sequence identifies a current traffic channel.

11. An apparatus for detecting bad received frames in a receiver in a digital communication system in which information is transmitted and received in signal bursts, some bits of each frame having a first interleaving level and other bits in each frame having a second interleaving level, said second interleaving level being lower than said first interleaving level, the apparatus comprising:

means for detecting possible bit errors in a predetermined redundancy-containing bit sequence having said second interleaving level; and means for indicating a bad received frame if at least one bit error has been detected in each signal burst.

12. The apparatus of claim 11, wherein said bit sequence has an interleaving level of 1, and said bit sequence is included in each signal burst.

13. The apparatus of claim 12, wherein said predetermined bit sequence is channel encoded.

14. The apparatus of claim 13, wherein said digital communication system is a digital radio communication system.

15. The apparatus of claim 14, wherein said digital radio communication system is a TDMA system.

16. The apparatus of claim 12, further comprising means for combining said indication of a bad received frame with other indications of a bad received frame.

17. The apparatus of claim 16, further comprising means for logically combining said indication of a bad received frame with other indications of a bad received frame.

18. The apparatus of claim 17, further comprising means for forming said other indications based on soft information on received bits.

19. The apparatus of claim 12, wherein said predetermined bit sequence is also used for another purpose than error detection.

20. The apparatus of claim 19, wherein said bit sequence identifies a current traffic channel.

* * * * *